May 12, 1964     E. W. CONRAD     3,132,476

THRUST VECTOR CONTROL APPARATUS

Filed April 27, 1961

*INVENTOR*
EARL W. CONRAD

BY

*ATTORNEY*

United States Patent Office 3,132,476
Patented May 12, 1964

3,132,476
THRUST VECTOR CONTROL APPARATUS
Earl W. Conrad, North Royalton, Ohio, assignor to the United States of America as represented by the Administrator of the National Aeronautics and Space Administration
Filed Apr. 27, 1961, Ser. No. 106,135
4 Claims. (Cl. 60—35.54)
(Granted under Title 35, U.S. Code (1952), sec. 266)

The invention described herein may be manufactured and used by or for the Government of the United States of America for governmental purposes without the payment of any royalties thereon or therefor.

The present invention relates generally to thrust-vector control techniques for aerial or nonatmospheric vehicles and, more particularly, to an apparatus and method for effecting separation of the rocket exhaust from the nozzle well to provide thrust-vector control.

A number of techniques have been employed to provide thrust-vector control for varying the flight path of aerial or non-atmospheric vehicles. Examples of the techniques which have been used extensively up to the present are the gimballed engine or nozzle, jet vanes, jetavators, and aerodynamic surfaces. Except for the latter case, vector control is provided for in these prior art arrangements by turning the rocket jet so as to create a moment about the center of gravity of the vehicle.

Although these devices and techniques are generally effective, they introduce undesirable disadvantages. For example, jet vanes and jetavators have a tendency to erode due to rocket exahust jet impingement; gimballed engines or nozzles involve systems which are very complex and heavy due to the necessity of flexible joints in the propellant lines and associated actuating equipment; aerodynamic surfaces are virtually useless at low Mach numbers or outside the atmosphere and must be used in combination with other systems.

A more recently-devised technique for varying the flight path of aerial or nonatmospheric vehicles is the jet-induced thrust-vector control. This technique provides for the injection of a secondary fluid into the rocket nozzle flow field so as to effect separation of the rocket exahust flow, thus producing a force perpendicular to the rocket thrust and thereby providing the moment about the vehicle center of gravity. Systems heretofore devised for inducing rocket nozzle flow separation have generally employed an arrangement whereby a fluid is injected into the rocket exhaust through flush slots, holes, or auxiliary nozzles positioned perpendicular to the nozzle wall or in the general direction of the rocket exhaust flow. In general, although such arrangements have been successfully employed, this technique of injecting a fluid into the rocket exhaust has not been found to be entirely satisfactory. One shortcoming of this technique is that only local areas of separated flow are developed which results in relatively low values of nozzle thrust-vector forces, thereby requiring larger amounts of auxiliary flow to effect a desired degree of trajectory control.

Accordingly, it is an object of this invention to provide a technique for effecting a more efficient thrust-vector control of aerial or nonatmospheric vehicles.

Another object of the invention is to provide a new and improved method of effecting rocket exhaust flow separation.

Still another object of the present invention is to provide a new and improved technique for causing a larger area of rocket exhaust jet separation from a rocket nozzle wall.

A further object of the invention is to provide a new and improved apparatus to effect improved exhaust flow separation in an exhaust nozzle.

According to the present invention, the foregoing and other objects are obtained by providing for the positioning of injection means relative to the rocket nozzle in a manner to direct the flow of a fluid in a direction counter to the rocket exhaust jet.

A more complete appreciation of the invention and many of the attendant advantages thereof will be readily apparent as the same becomes better understood by reference to the following detailed description when considered in connection with the accompanying drawing wherein.

Figure 1:
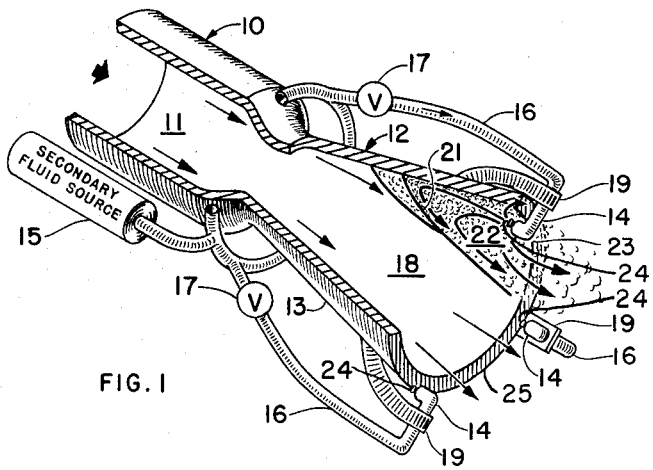
FIG. 1 is a perspective view, partly in section, of one embodiment of this invention.

Referring now to the drawing wherein like reference numerals designate identical or corresponding parts throughout the several views, and more particularly to FIG. 1 wherein is disclosed a conventional reaction propulsion motor 10 having a combustion chamber 11 connected to a convergent-divergent rocket exhaust nozzle 12. As shown, the exit plane of the divergent portion 13 of the exhaust nozzle 12 is provided with one or more auxiliary injection devices such as, for example, nozzle passages or the like 14 having the exit planes 24 thereof parallel with the exit plane 25 of the nozzle 12, which provide for either subsonic or supersonic fluid injection. The auxiliary nozzles are connected to a secondary fluid source 15 which may be under a pressure through individual feedlines 16. Each of the feedlines 16 is provided with a flow control valve 17 for regulation of the quantity of secondary fluid to be injected by the auxiliary nozzles 14. The secondary fluid consisting entirely or partly of gas or liquid and may be either chemically inert or active with the exhaust flow 18 formed by the exhaust nozzle 12. The fluid source 15 may be either an independent source as shown, a combustion chamber of a rocket motor, or the discharge from a propellant pump. The control valve 17 provides regulation of the quantity of secondary fluid to be injected by the auxiliary nozzles 14. When required, one or more of the injection devices 14 are immersed into the rocket exhaust 18 by insertion devices such as a hydraulic or electrical actuator or the like 19 to inject a fluid upstream into the divergent portion 13 of the exhaust nozzle. The upstream fluid injection stagnates, thereby producing a shock front 21. Because the rocket exhaust boundary layer cannot negotiate the adverse pressure gradient produced by the shock front, separation 22 occurs, thereby producing a region of high pressure on the internal wall 23 of the divergent portion 13 of the rocket exhaust nozzle. This counter injection provides for flow separation much farther forward of the injection point than perpendicular injection and also tends to prevent reattachment of the separated rocket exhaust flow to the rocket nozzle wall. This combined effect of counter injection results in a greatly enlarged area of separated flow than is obtainable by perpendicular injection. Therefore, large thrust vector forces can be obtained with a minimum of secondary flow injection. Obviously, by regulating the amount of secondary fluid injection and immersing selected ones of the injection nozzles in the rocket nozzle exhaust flow, the required nozzle thrust-vector forces for a desired flight path can be easily obtained.

Figure 2:
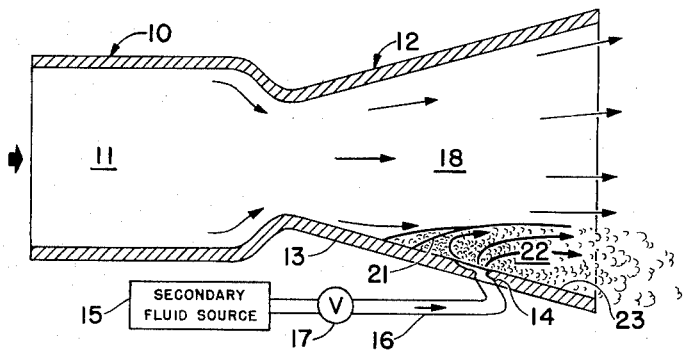
FIG. 2 is a schematic illustration, partly in section, of an alternative embodiment of this invention.

Referring now to the alternative embodiment of the invention shown in FIG. 2, an injection device such as a nozzle 14 is formed downstream of the exhaust nozzle throat in the wall of the divergent rocket exhaust nozzle 16 at an acute angle to the direction of the rocket exhaust flow 18. The injection device 14 is connected through a fluid feedline 16 to a secondary fluid source 15. A control valve 17 is positioned within the fluid feedline 16 for regulating the proper amount of fluid to be injected counter to the rocket exhaust flow. Separation 22 of the rocket exhaust 18 produces high pressure forces on the internal divergent rocket nozzle wall 23 in the manner described hereinbefore in reference to FIG. 1.

Figure 3:
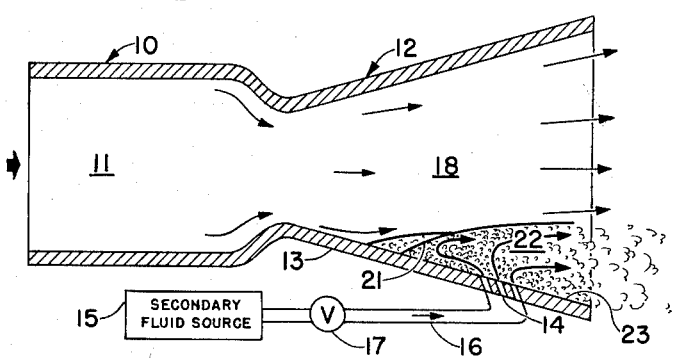
FIG. 3 is a schematic illustration, partly in section, of a further alternative embodiment of this invention.

Referring to the alternative embodiment of FIG. 3, the secondary fluid injection devices are comprised of passages 14 formed in the wall of the divergent rocket exhaust nozzle 13 at an acute angle to the rocket exhaust jet 18. The passages 14 are connected through a fluid feedline 16 to a source of secondary fluid 15. A control valve 17 is positioned within the fluid feedline 16 for regulating the amount of fluid to be injected counter to the rocket exhaust. High pressure forces on the internal divergent rocket nozzle wall 23 results from separation 22 of the rocket exhaust 18, as described hereinbefore in reference to FIG. 1.

It is obvious that the instant invention may be utilized with any type of exhaust nozzle connected to the reaction motor combustion chamber such as an external-expansion nozzle or the like and is not to be regarded as being restricted to a convergent-divergent exhaust nozzle. Although only a single flush nozzle or grouping of passages is shown in FIG. 2 and FIG. 3, it will be understood by those skilled in the art to which the invention relates, that a multiple of nozzles or groupings of passages may be used as required and that the injection termini location may be anywhere in or near the rocket exhaust nozzle.

Obviously, many modifications and variations of the present invention are possible in the light of the above teachings. It is, therefore, to be understood that within the scope of the appended claims, the invention may be practiced other than as specifically described.

What is claimed is:
1. An apparatus comprising an exhaust nozzle of a combustion powerplant forming a supersonic exhaust jet and at least one auxiliary nozzle positioned at the downstream end thereof for forming an auxiliary jet; said exhaust nozzle including convergent and divergent portions; said auxiliary jet being moveable from a first position radially outward from the termination of said divergent portion to a second position radially inward of the periphery of said termination; said auxiliary nozzle having an exit plane; said exhaust nozzle having an exit plane at the termination of the divergent portion; said auxiliary nozzle exit plane and said exhaust nozzle exit plane disposed in parallel relation to thereby provide for substantially directly opposite exhaust and auxiliary jets; a source of fluid to supply said auxiliary nozzle; conduit means for interconnecting said auxiliary nozzle and source of fluid; valve means disposed in said conduit means for controlling the flow of fluid to said auxiliary nozzle; and insertion means for moving said auxiliary nozzle from said first position to said second position along said auxiliary nozzle exit plane into said oppositely flowing exhaust jet.

2. In apparatus for controlling the thrust-vector of a vehicle having a supersonic nozzle including a convergent portion and a divergent portion with an exit plane at the termination thereof of the type wherein a plurality of jets are positioned around the divergent portion to effect rocket exhaust flow separation by injecting a fluid thereinto; the improvement comprising means for mounting the plurality of jets about the periphery of the termination of the divergent portion of the supersonic nozzle, each of said jets facing in a direction opposite the rocket exhaust flow while terminating in an exit plane substantially parallel with the exit plane of the divergent portion of the supersonic nozzle and being moveable from a first position radially outward from the rocket exhaust flow to a second position in said exhaust flow whereby fluid is injected into the divergent portion of the supersonic nozzle through the exit plane thereof in a direction opposite the rocket exhaust flow to effect flow separation, and means for selectively moving each of said jets from said first position to said second position while maintaining the same in the exit plane thereof and facing said opposite direction thereby enlarging the area of separated exhaust flow by effecting flow separation toward the forward end of the divergent portion of the supersonic nozzle.

3. Apparatus as claimed in claim 2 wherein said means for selectively moving the jets includes a hydraulic actuator.

4. Apparatus as claimed in claim 2 wherein said means for moving the jets includes an electrical actuator.

References Cited in the file of this patent

UNITED STATES PATENTS

| 2,763,984 | Kadosch et al. | Sept. 25, 1956 |
| 2,793,493 | Kadosch et al. | May 28, 1957 |
| 2,916,873 | Walker | Dec. 15, 1959 |
| 2,943,821 | Wetherbee | July 5, 1960 |
| 2,952,123 | Rich | Sept. 13, 1960 |
| 3,024,602 | Bertin et al. | Mar. 13, 1962 |
| 3,036,430 | Eggers et al. | May 29, 1962 |

FOREIGN PATENTS

| 820,427 | Great Britain | Sept. 23, 1959 |

(corresponding U.S. 3,020,714 Feb. 13, 1962)

| 64,773 | France | June 29, 1955 |
| 1,197,701 | France | June 8, 1959 |